Figure 1:
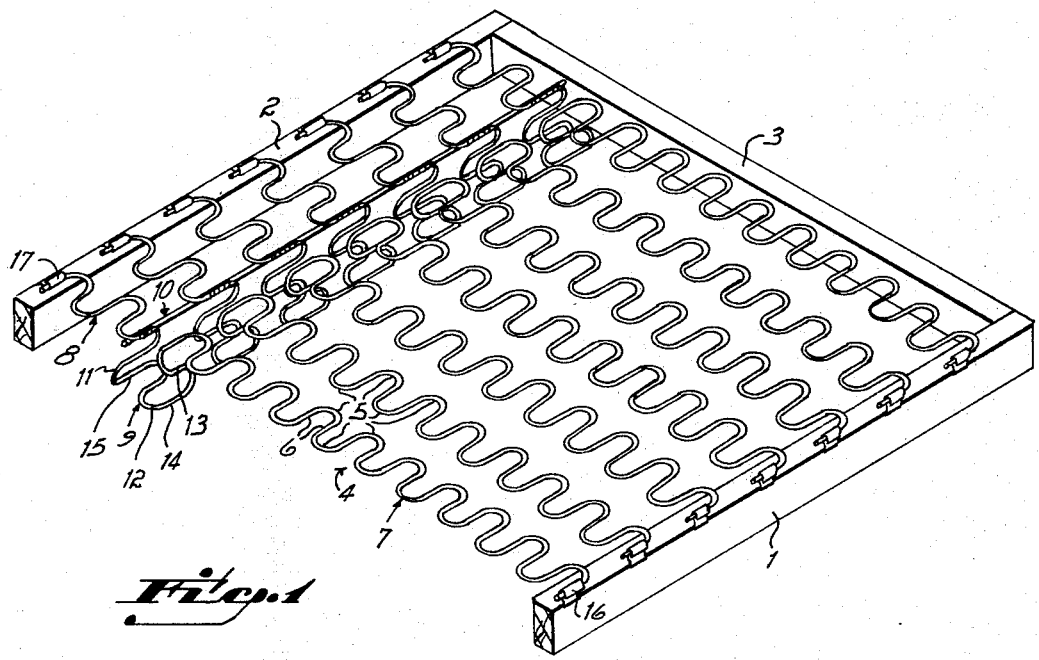

Nov. 22, 1966  J. R. GREENO  3,287,009
SPRING CUSHION CONSTRUCTION

Filed June 1, 1965  2 Sheets-Sheet 1

INVENTOR
John R. Greeno
BY
Wood, Herron & Evans
ATTORNEYS

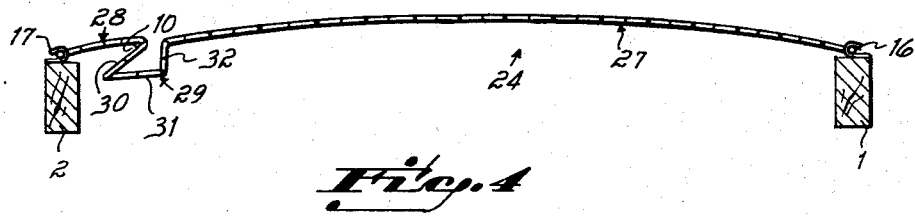
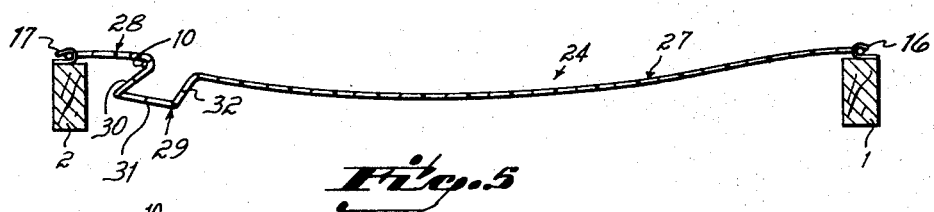
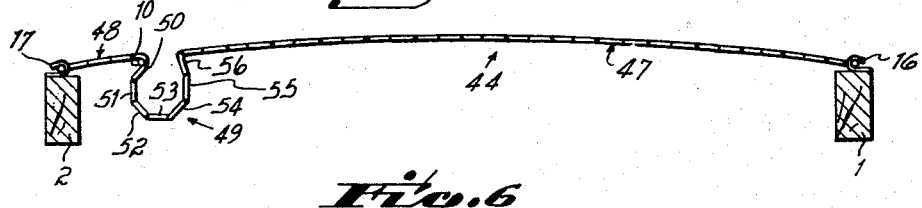
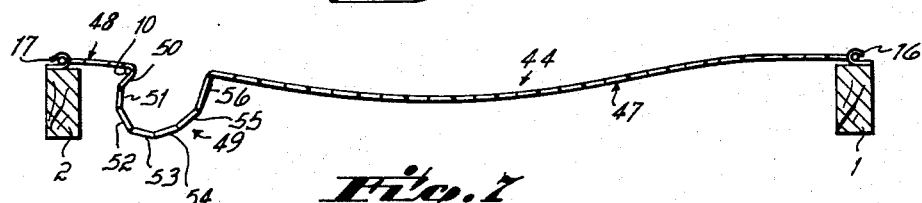
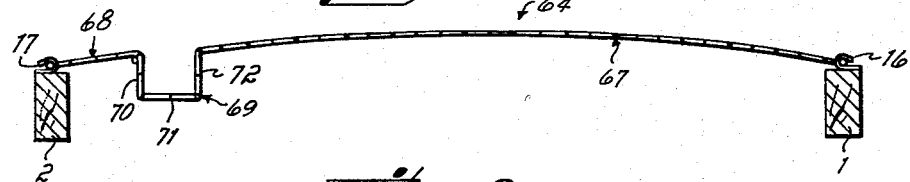
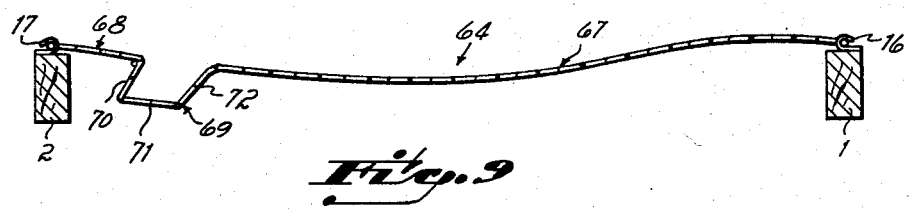

United States Patent Office 3,287,009
Patented Nov. 22, 1966

3,287,009
SPRING CUSHION CONSTRUCTION
John R. Greeno, New Richmond, Ohio, assignor to Cincinnati Specialty Products Company, Cincinnati, Ohio, a corporation of Ohio
Filed June 1, 1965, Ser. No. 460,088
9 Claims. (Cl. 267—111)

This invention relates to sinuous formed springs used in the base or support units of seats or sleeping equipment. These sinuous formed springs are commonly called zig-zag springs and, for the sake of convenience, will be referred to as such hereinafter.

It has been an objective of this invention to provide an improved zig-zag spring unit which is both economical to manufacture and to assemble into a unit of furniture.

Another objective of this invention has been to provide a prestressing lever arrangement integral with and forming a part of a zig-zag spring such that there is no need for additional levers, tension springs, etc. to be incorporated into the cushion assembly. These additional levers, tension springs and other additive elements used to prestress or place the zig-zag spring in tension are undesirable because they are uneconomical to manufacture and assemble. On the other hand, I incorporate the prestressing lever into the spring as an integral part of it to effect economies in both the manufacture of the spring as well as in the assembly of it to form a completed cushion. Additionally, a prestressing lever formed integrally with the spring is much more effective to prestress the spring than many of the commercial so called prestressing spring assemblies which oftentimes simply provide hinge points or points of flexure for the spring.

Another objective of this invention has been to provide a zig-zag spring unit so configurated that the spring provides gentle and uniform support or flexing action as required by the weight of the user. This is in contrast to many "soft edge" springs which have a hinge action or a collapsing action under a minimal load rather than a reaction determined by the requirements of the user.

Still another objective of this invention has been to provide a point of longitudinal resiliency in a zig-zag spring unit such that the spring yields or increases in length in direct proportion to the support required or the weight of the user. Thus, the spring provides a gentle support of increasing flexibility or spring action as the weight upon the spring increases. To this end, the spring of this invention incorporates, for want of a better name, a reverse delta bend into the spring so that it is bent out of its generally horizontal plane of support and subsequently back into this plane somewhere between its ends. The reverse delta bend may be located anywhere between the ends of the spring depending upon the spring action required but should not be located directly at the end. If located at the end, an undesirable pivoting or hinge action results and the spring yields nearly all of its flexure under a minimal load rather than giving it up gradually depending upon the support required.

Still another objective of this invention has been to provide a prestressed and soft edge zig-zag spring unit which may be easily and conveniently attached to different parts of a furniture frame so as to provide differing degrees of spring action. Thus, when the soft edge or more resilient end portion of the spring is attached to the top of a furniture frame, it gives a different action than when attached to the bottom or vertical part of the frame. Thus, the same identical zig-zag spring unit may be attached differently to provide different spring actions.

Figure 2:
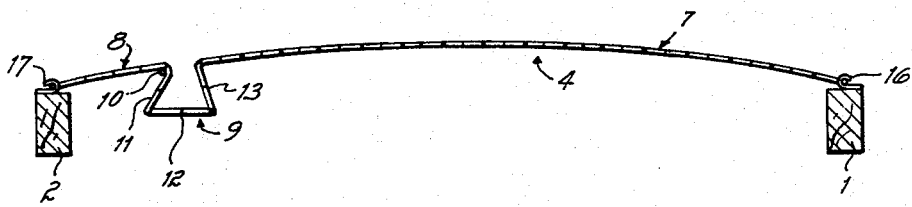
Figure 3:
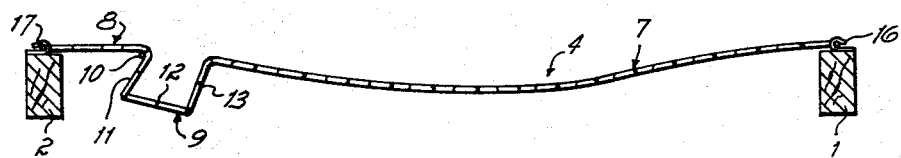

These and other objects and advantages of this invention will be more readily apparent from a description of the drawings in which:

FIGURE 1 is a perspective view of a seat cushion assembly incorporating the inventive zig-zag spring unit of this application, FIGURE 2 is a cross-sectional view taken along line 2—2 of FIGURE 1, FIGURE 3 is a cross-sectional view of the seat of FIGURE 2 with the spring in the position which it assumes when a person is seated on the seat, FIGURE 4 is a cross-sectional view of a second embodiment of the cushioned seat, FIGURE 5 is a cross-sectional view of the seat of FIGURE 4 with the spring in the position it assumes with a person seated upon it, FIGURE 6 is a cross-sectional view of a third embodiment of the seat, FIGURE 7 is a cross-sectional view of the seat of FIGURE 6 with the spring in the position it assumes when a person is seated upon the seat, FIGURE 8 is a cross-sectional view of a fourth embodiment of the seat cushion, FIGURE 9 is a cross-sectional view of the embodiment of FIGURE 8 with the spring in the position which the spring assumes when a person is seated upon it.

Referring to FIGURE 1, it will be seen that the seat cushion used to illustrate the inventive zig-zag spring of this application includes front and rear wooden frame members 1 and 2 respectively, interconnected by side frame members 3 (only one of which is shown). Extending from front to rear between the frame members 1, 2 are zig-zag springs 4 consisting of reversely bent arcuate sections 5 interconnected by straight sections 6. The ends of each of these springs 4 are connected to the frame members 1 and 2 by conventional clips 16, 17.

Each of these zig-zag springs consists of a load-bearing portion 7 and an end attachment portion 8 interconnected by a soft or resilient portion 9. Both the load-bearing portion 7 and the end attachment portion 8 are located in the same generally horizontal arcuate plane so that the attachment portion forms a continuation of the load-bearing portion. In other words, both portions 7 and 8 form an arc of a large circle located upon a common center.

In a preferred embodiment, the attachment portion 8 consists of four reversely bent sections 5 interconnected by five straight sections 6. The load-bearing portion 7 is much longer than the attachment portion 8 and includes many more reversely bent arcuate and straight sections than the attachment portion.

The resilient portion 9 is formed as an integral portion of the spring 4 and consists of a downwardly and rearwardly extending leg 11, a horizontal and forwardly extending leg 12, and an upwardly and rearwardly extending leg 13. Each leg includes two arcuate sections 5 interconnected by a straight section 6.

A border wire 10 extends laterally between the side frame members 3 and is attached to each of the springs 4 inside the acute angle formed by the bend in each of the springs 4 between the attachment portion 8 and the resilient portion 9. This border wire is wired or connected by a conventional clip to each of the spring units 4. It serves as a point of attachment for the upholstery of the seat and back cushion of the chair.

Referring to FIGURE 3, it will be seen that the zig-zag spring unit forms a gentle S-curve when a person is seated upon the spring. Thus, when loaded vertically or when the load-bearing portion 7 is forced downwardly, the spring yields longitudinally in its most resilient point. This is the resilient portion 9 which flexes so as to spread the tops of the legs 11 and 13 and increase the acute angles between the load-bearing and attachment portions 7 and 8 and the resilient portion 9. Apparently the legs 12 and 13 of the resilient portion 9 act as levers to apply higher torsional forces to the straight sections 14, 15 of the resilient portion 9 so that most of the flexing occurs in these. The previously prestressed spring (prestressed when stretched between the attachment bracket 16, 17 of the frame) thus flexes and the resilient portion continues to spread as the load is increased on the load-bearing section 7. The zig-zag spring unit 4 thus provides gentle and uniform support as required by the weight of the person seated in the chair.

Referring to FIGURES 4 and 5, there is illustrated a second embodiment of the zig-zag spring unit of this application. In this embodiment, as in all embodiments to be described hereinafter, similar parts have been given similar numerals.

In this embodiment, the zig-zag spring unit 24 consists of reversely bent arcuate sections interconnected by straight sections. The spring has a load-bearing portion 27, an attachment portion 28 adjacent the rear end, and a resilient portion 29 interconnected between the attachment portion 28 and the load-bearing portion 27. All three portions 27, 28 and 29 are an integral portion of the spring 4. As in the embodiment of FIGURE 1, the attachment portion 28 includes four loops or reversely bent arcuate sections while the load-bearing portion is much longer and includes many more loops. Both portions 27, 28 are located in the same general horizontal plane and are arcuately bent so as to form arcs upon a generally common radius circle.

The resilient portion 29 consists of a downwardly and rearwardly extending leg 30, a forwardly extending leg 31 and an upwardly extending leg 32. The downwardly and rearwardly extending leg 30 is connected at its top to the attachment portion 28 while the upper end of the upwardly extending leg 32 is connected to the rear end of the load-bearing portion 27 of the spring 24. All three legs 30, 31 and 32 of this configuration spring include two loops, or otherwise expressed, include two reversely bent arcuate sections interconnected by a straight section.

When the spring is assembled or attached to the front end rear frame members 1 and 2, the spring 24 is prestressed or stretched into a larger radius circle than that which it would assume if allowed to relax completely. In the stretched condition, the spring 24 is attached to the frame elements 1 and 2 by conventional clips 16, 17.

As in the case of the embodiment illustrated in FIGURE 1, when a vertical load is placed upon the seat cushion assembly, the spring of FIGURES 4 and 5 accepts a gentle S-curve as it stretches longitudinally in the resilient portion 29. The greater the load, the greater the longitudinal stretch of the resilient portion 29 so that the spring 24 always provides a uniform support for all weights.

Referring to FIGURES 6 and 7, there is illustrated still another embodiment of the invention of this application. In this embodiment, the load-bearing portion 47 and the attachment portion 48 of the spring 44 of the integral spring 44 are identical to the load-bearing and attachment portions respectively of FIGURE 1. However, in this embodiment, the resilient portion 49 is configurated differently. Specifically, the resilient portion 49 consists of seven loops or arcuate sections bent in the generally circular configuration. The first loop 50 is a downwardly and rearwardly extending loop which is connected at its top to the attachment portion and at its rear to a vertical loop 51. The vertical loop 51 is in turn connected to a downwardly and forwardly extending loop 52, which is connected at its lower end to a horizontally extending loop 53. The horizontal loop 53 is in turn connected at its front end to a forwardly and upwardly extending loop 54 which is in turn connected to an upwardly extending loop 55. The upper end of the upwardly extending loop is connected to an upwardly and rearwardly extending loop 56, the upper end of which is connected by a straight section to the load-bearing section 47.

As in the case of the earlier described embodiments the spring 44 is prestressed when it is stretched between the two brackets 16 and 17 attached to the front and rear frame members, 1 and 2, respectively. When a vertical load is placed upon the seat, the spring deflects in the center to form a gentle S-configuration which the longitudinally resilient portion 49 stretching as shown in FIGURE 7 so that the upper loops 50, 56 are spread apart. This embodiment also gives a uniform support for any weight person seated in the chair incorporating these zig-zag springs 44.

The fourth and last embodiment is illustrated in FIGURES 8 and 9. In this embodiment of the integral zig-zag spring 64, the load-bearing portion 67 and attachment portion 68 are once again identical to the load-bearing end attachment portions 7 and 8 respectively of the embodiment illustrated in FIGURE 1. It is only in the resilient section 69 that this embodiment differs from those described hereinabove. Specifically, this embodiment consists of two parallel legs 70, 72 located in generally vertical planes and extending downwardly from the front end of the attachment portion 68 and the rear end of the load-bearing portion 67 respectively. The lower ends of these legs 70, 72 are interconnected by a generally horizontal leg 71.

When the spring 64 is assembled or spread between the two brackets 16, 17 of the seat frame, the spring is prestressed. Thereafter, when a vertical load is placed upon the spring 64, it forms a gentle S-curve, the degree of flexure depending upon the weight placed upon the spring.

While the zig-zag spring units of this application have all been described in relation to the seat cushion of an item of furniture, it should be appreciated that these springs are equally useful in other items of furniture or in other types of seats, as for example, automobile, airplane or truck seats. Additionally, the springs may be stretched between the transverse frame members of a seat rather than the front and rear members. A different spring action may also be achieved by locating the resilient portion in a different longitudinal location of the spring as, for example, at the front end rather than the rear of the seat.

While only four embodiments of the invention have been illustrated and described herein, those skilled in the art to which the invention pertains will readily appreciate that other changes and modifications may be made without departing from the spirit of the invention. Therefore, I do not intend to be limited except by the scope of the appended claims.

Having described my invention, I claim:

1. For use in a spring cushion construction of the type having spaced frame members, a zigzag spring strip consisting of straight sections interconnected by reversely bent arcuate sections, said spring strip being adapted to be extended across said frame members, said spring strip having a slightly arcuate load supporting portion located in a generally horizontal plane and having at one end an attaching portion including at least two arcuate sections located in the same general horizontal plane as said load supporting portion, said zigzag spring having a resilient portion located between and interconnecting said load supporting portion and said attaching portion, said resilient portion having greater longitudinal resiliency than said load supporting and attaching portions, said resilient portion comprising at least two downwardly extending arcuate sections interconnected by a straight section to at least two generally horizontal arcuate sections which in turn are connected by a straight section to at least two upwardly extending arcuate sections.

2. For use in a spring cushion construction of the type having spaced frame members, a zigzag spring strip consisting of straight sections interconnected by reversely bent arcuate sections, said spring strip being adapted to be extended across said frame members, said spring strip having a slightly arcuate load supporting portion located in a generally horizontal plane and having at one end an attaching portion including at least one arcuate section located in the same general horizontal plane as said load supporting portion, said zigzag spring having a resilient portion located between and interconnecting said load supporting portion and said attaching portion, said resilient portion having greater longitudinal resiliency than said load supporting and attaching portions, said resilient portion comprising at least two downwardly extending arcuate sections interconnected by a straight section to at least two generally horizontal arcuate sections which in turn are connected by a straight section to at least two upwardly extending arcuate sections.

3. In a spring cushion construction, spaced frame members, a zigzag spring strip consisting of straight sections interconnected by reversely bent arcuate sections, said spring strip extending across said frame members, said spring strip having a slightly arcuate load supporting portion located in a generally horizontal plane and having at one end an attaching portion including at least one arcuate section located in the same general horizontal plane as said load supporting portion, said zigzag spring having a soft edge resilient portion located between and interconnecting said load supporting portion and said attaching portion, said resilient portion having greater longitudinal resiliency than said load supporting and attaching portions, said resilient portion consisting of at least one downwardly and rearwardly extending arcuate section interconnected by a straight section to at least one generally horizontal arcuate section which in turn is connected by a straight section to at least one upwardly extending arcuate section, said downwardly and upwardly extending arcuate sections being connected to said attaching and load supporting portions respectively.

4. In a spring cushion construction, spaced frame members, a zigzag spring strip consisting of straight sections interconnected by reversely bent arcuate sections, said spring strip extending across said frame members, said spring strip having a slightly arcuate load supporting portion located in a generally horizontal plane and having at one end an attaching portion including at least one arcuate section located in the same general horizontal plane as said load supporting portion, said zigzag spring having a soft edge resilient portion located between and interconnecting said load supporting portion and said attaching portion, said resilient portion having greater longitudinal resiliency than said load supporting and attaching portions, said resilient portion consisting of at least one downwardly and rearwardly extending arcuate section interconnected by a straight section to at least one generally horizontal arcuate section which in turn is connected by a straight section to at least one upwardly and rearwardly extending arcuate section, said downwardly and upwardly extending arcuate sections being connected to said attaching and load supporting portions respectively.

5. In a spring cushion construction, spaced frame members, a zigzag spring strip consisting of straight sections interconnected by reversely bent arcuate sections, said spring strip extending across said frame members, said spring strip having a slightly arcuate load supporting portion located in a generally horizontal plane and having at one end an attaching portion including at least one arcuate section located in the same general horizontal plane as said load supporting portion, said zigzag spring having a soft edge resilient portion located between and interconnecting said load supporting portion and said attaching portion, said resilient portion having greater longitudinal resiliency than said load supporting and attaching portions, said resilient portion being generally curvilinear and including at least one downwardly extending arcuate section connected to at least one generally horizontal arcuate section which in turn is connected to at least one upwardly extending arcuate section, said downwardly and upwardly extending arcuate sections being connected to said attaching and load supporting portions respectively.

6. In a spring cushion construction, spaced frame members, a zigzag spring strip consisting of straight sections interconnected by reversely bent arcuate sections, said spring strip extending across said frame members, said spring strip having a slightly arcuate load supporting portion located in a generally horizontal plane and having at one end an attaching portion including at least one arcuate section located in the same general horizontal plane as said load supporting portion, said zigzag spring having a soft edge resilient portion located between and interconnecting said load supporting portion and said attaching portion, said resilient portion having greater longitudinal resiliency than said load supporting and attaching portions, said resilient portion comprising at least one vertically extending arcuate section connected to at least one generally horizontal arcuate section which in turn is connected to another vertically extending arcuate section, said vertically extending sections being connected to said attaching and load supporting portions respectively.

7. In a spring cushion construction, spaced frame members, a zigzag spring strip consisting of straight sections interconnected by reversely bent arcuate sections, said spring strip extending across said frame members, said spring strip having a slightly arcuate load supporting portion located in a generally horizontal plane and having at one end an attaching portion including at least one arcuate section located in the same general horizontal plane as said load supporting portion, said zigzag spring having a soft edge resilient portion located between and interconnecting said load supporting portion and said attaching portion, said resilient portion having greater longitudinal resiliency than said load supporting and attaching portions, said resilient portion comprising at least one downwardly and rearwardly extending arcuate section connected to at least one generally horizontal arcuate section which in turn is connected to at least one vertically extending arcuate section, said downwardly and rearwardly extending section and said vertical section being connected to said attaching and load supporting portions respectively.

8. In a spring cushion construction, spaced frame members, a zigzag spring strip consisting of straight sections interconnected by reversely bent arcuate sections, said spring strip extending across said frame members, said spring strip having a load supporting portion located in a generally horizontal plane and having at one end an attaching portion including at least one arcuate section located in the same general horizontal plane as said load supporting portion, said zigzag spring having a resilient portion located between and interconnecting said load supporting portion and said attaching portion, said resilient portion having greater longitudinal resiliency than said load supporting and attaching portions, said resilient portion comprising at least one downwardly extending arcuate section connected to at least one generally horizontal arcuate section which in turn is connected to at least one upwardly extending arcuate section, said downwardly and upwardly extending sections being connected to said attaching and load supporting portions respectively.

9. In a spring cushion construction, spaced frame members, a zigzag spring strip consisting of straight sections interconnected by reversely bent arcuate sections, said spring strip extending across said frame members, said spring strip having a load supporting portion generally located in a load supporting plane, said spring strip having at one end an attaching portion including at least one arcuate section located in the same general plane as said load supporting portion, said zigzag spring strip having a resilient portion located between and interconnecting said load supporting portion and said attaching portion, said resilient portion having greater longitudinal resiliency than said load supporting and attaching portions, said resilient portion being bent out of said load supporting plane and comprising first, second, and third sections, said first section being bent at an angle to said load supporting plane and interconnecting said load supporting portion and said second section, said second section being located in a plane generally parallel to said load supporting plane and interconnecting said first and third sections, said third section being bent at an angle to said load supporting plane and interconnecting said second section and said attaching portion, each of said first, second and third sections of said spring strip including at least one arcuate section.

References Cited by the Examiner

UNITED STATES PATENTS 2,731,075   1/1956   Flint _____ 267—107 X

ARTHUR L. LA POINT, *Primary Examiner.*